(12) United States Patent
Watanabe et al.

(10) Patent No.: US 6,496,539 B2
(45) Date of Patent: Dec. 17, 2002

(54) METHOD AND APPARATUS FOR DETECTING MOTION

(75) Inventors: Hiromi Watanabe, Mitaka (JP); Kenichi Iwata, Higashimurayama (JP); Hiroshi Hatae, Toda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/033,928

(22) Filed: Jan. 3, 2002

(65) Prior Publication Data

US 2002/0054643 A1 May 9, 2002

Related U.S. Application Data

(63) Continuation of application No. 09/289,678, filed on Apr. 12, 1999.

(30) Foreign Application Priority Data

Apr. 14, 1998 (JP) ............................................. 10-102884

(51) Int. Cl.$^7$ ................................................ H04N 7/36
(52) U.S. Cl. .............. 375/240.16; 348/699; 375/240.14
(58) Field of Search ....................... 375/240.14, 240.16; 348/699; H04N 7/36

(56) References Cited

U.S. PATENT DOCUMENTS

| | | | | |
|---|---|---|---|---|
| 6,167,090 A | * | 12/2000 | Iizuka ................... | 375/240.16 |
| 6,205,177 B1 | * | 3/2001 | Girod et al. ........... | 375/240.14 |
| 6,263,025 B1 | * | 7/2001 | Iizuka ................... | 375/240.16 |
| 6,370,195 B1 | * | 4/2002 | Watanabe et al. ...... | 375/240.16 |

FOREIGN PATENT DOCUMENTS

| | | |
|---|---|---|
| JP | 5-236455 | 9/1993 |
| JP | 06-070308 | 3/1994 |
| JP | 07-162867 | 6/1995 |
| JP | 09-162747 | 6/1997 |
| JP | 10-051793 | 2/1998 |

OTHER PUBLICATIONS

IEEE 1997 International Solid–State Circuits Conference, "A Real Time MPEG2 Main Profile, Main Level Motion–Estimator Chipset", pp. 260–261.

IEEE 1996 Custom Integrated Circuits Conference, "VLSI Implementation of Mierarchical Motion Estimator for MPEG2 MP@HL", pp. 351–354.

IEEE 1996 Custom Integrated Circuits Conference, "A Cascadable 200 GOPS Motion Estimation Chip for HDTV Applications", pp. 355–358.

* cited by examiner

*Primary Examiner*—Howard Britton
(74) *Attorney, Agent, or Firm*—Mattingly, Stanger & Malur, P.C.

(57) ABSTRACT

There is disclosed a method and apparatus for detecting motion by a video encoder. The method starts with dividing a target block whose motion is to be detected into blocks at different pixel positions. A reference image block is extracted from a reference image. The degrees of similarity of the blocks to the reference image block are simultaneously calculated by a calculating unit. A block having the highest degree of similarity is determined, based on their degrees of similarity. A vector corresponding to the determined block is taken as a motion vector representing the block.

3 Claims, 12 Drawing Sheets

METHOD AND APPARATUS FOR DETECTING MOTION

This is a continuation application of U.S. Ser. No. 09/289,678, filed Apr. 12, 1999.

BACKGROUND OF THE INVENTION

The present invention relates to a method and apparatus for detecting motion and, more particularly, to a method and apparatus for detecting motion of a picture occurring among different frames of image, i.e., occurring with a lapse of time. Especially, the invention relates to a method and apparatus which is for use with a video encoder for encoding motion images to make motion compensation.

ITU-T (International Telecommunication Union Telecommunication Standardization Sector) recommends H.261 and H.262 as methods for encoding, storing, and transmitting image signals. ISO (International Organization for Standardization) recommends MPEG-1(11172-2) and MPEG-2 (13818-2). These methods adopt interframe prediction for motion compensation in encoding image signals. It is known that video signals produce highly redundant signals. Motion compensation interframe prediction is a technique for removing such redundancy. In the technique of motion compensation interframe prediction, each image frame to be compressed is divided into plural blocks (hereinafter referred to as target compressing blocks) that will be compressed. The target compressing blocks to be compressed are handled separately. In particular, an image frame processed prior to one target compressing block to be compressed is referred to as a reference image frame. A search area in which motion is detected is set close to the target compressing block within the reference image frame. Plural blocks (hereinafter referred to as reference image blocks) having the same size as the target compressing blocks are extracted from the search area. These reference image blocks are searched for a reference image block closest to the target compressing blocks.

Then, the difference between the target compressing block and the found reference image block is encoded, thus producing a compressed code sequence about the target compressing block. Motion detection is processing to search for this closest reference image block. A motion vector is a displacement on the viewing screen between each target compressing block and each corresponding reference image block found. Usually, such motion detection is performed by a video encoder.

Motion detection is introduced by various papers, literature, patent specifications, and so on. Most common procedure starts with calculating the absolute values of the differences in pixel between the target compressing block (also referred to as the target block) and every reference image block within the reference image frame. The sum of the absolute values of the differences is calculated for each reference image block. A reference image block providing the least sum is found. The displacement on the viewing screen between the detected reference image block and the target block is expressed in terms of horizontal and vertical displacement components, thus producing a motion vector. This procedure is known as the full-search procedure.

In the full-search procedure, the absolute values of the differences between all pixels contained in the target block and all pixels contained in all reference blocks within a reference image frame are calculated. The sum of the absolute values of the differences needs to be calculated for each reference block. Therefore, the amount of calculation is exorbitant. Hence, high-speed computational speed is necessary.

Figure 14:
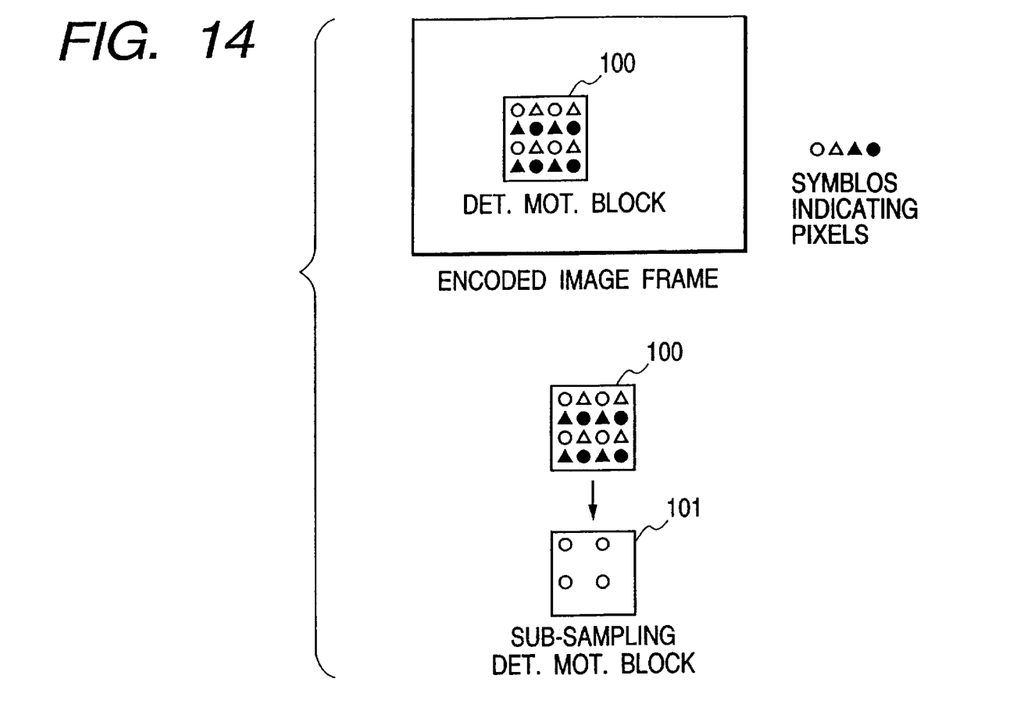
FIG. 14 is a diagram illustrating one example of target block undergone motion detection processing.
Figure 15:
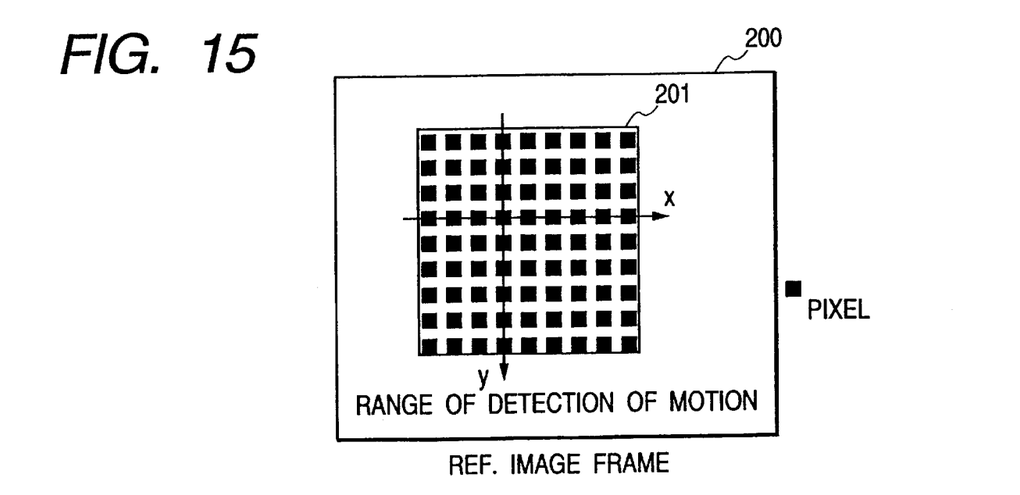
FIG. 15 is a diagram illustrating a search area processed by a motion detection method.
Figure 16:
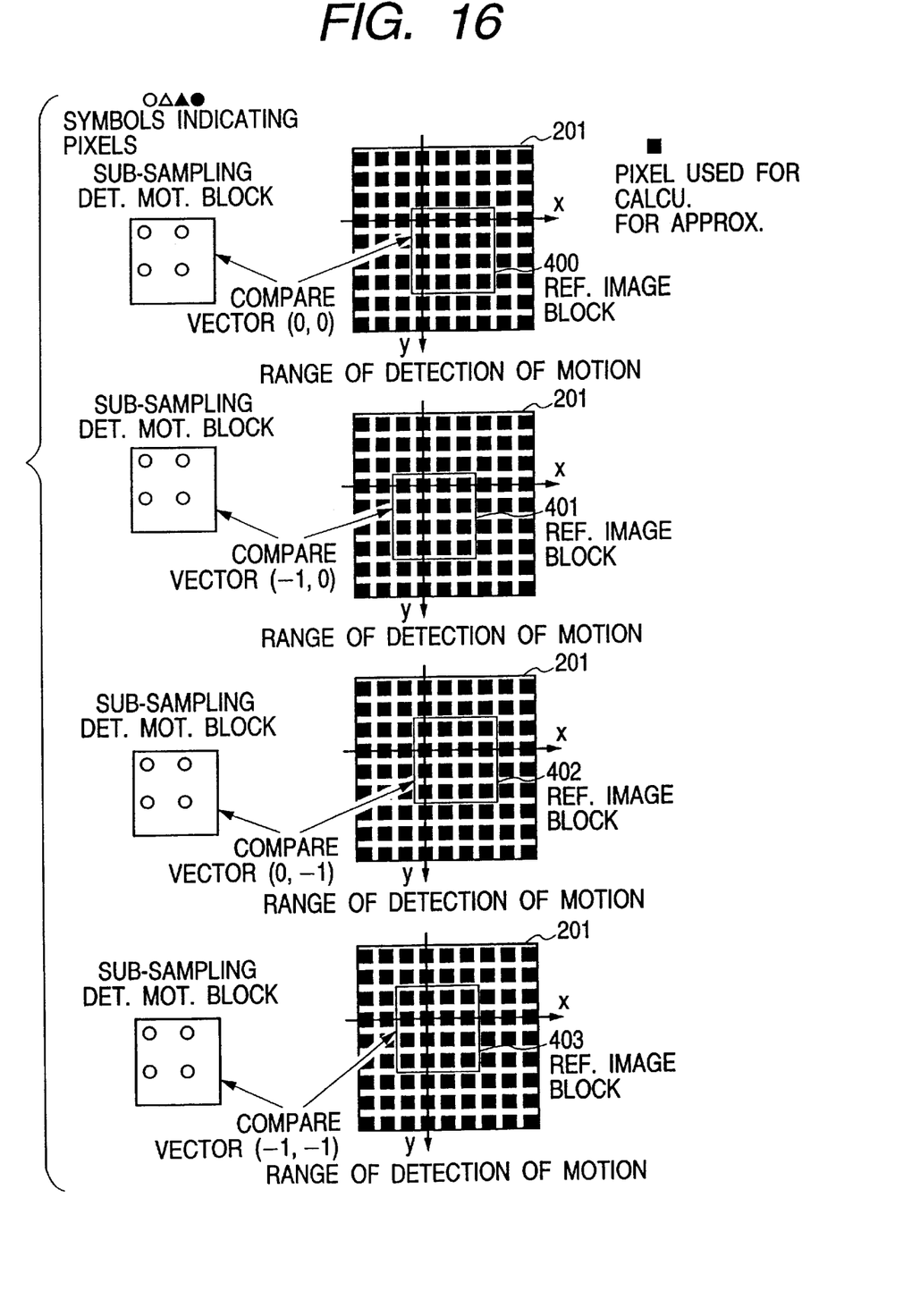
FIG. 16 is a diagram illustrating a comparison method used in a motion detection method.

A sub-sampling procedure as shown in FIGS. 14–16 is considered as a method of detecting motion with a reduced amount of calculation. In this method, a target block 100 whose motion is to be detected within an encoded image frame is sub-sampled both horizontally and vertically at intervals of one pixel. Thus, a sub-sampled target block 101 is obtained. A search area 201 in which motion is detected is set within a reference image frame 200 shown in FIG. 15. The differences between the pixels of all the reference blocks in the search area 201 within the frame 200 and sample pixels are taken. Using these differences, the degrees of approximation of images are found. A reference image block having the highest degree of approximation is found. The displacement on the viewing screen between this reference image block and the target block is represented as a motion vector.

A multi-stage search method for finding a motion vector is also conceivable. In particular, the sub-sampling procedure is effected not for all reference image blocks within a reference image frame. Reference image frames are taken horizontally and vertically as image frames at intervals of 2 pixels. That is, the number of reference image blocks within each reference image frame is reduced to one-fourth. The degrees of similarity of all the reference blocks are found. A reference image block having the highest degree of similarity is detected. The displacement on the viewing screen between the detected reference image block and the target block is represented by horizontal and vertical displacement components, thus producing a motion vector.

SUMMARY OF THE INVENTION

The aforementioned full-search method needs a large amount of calculation and so it is difficult to widen the search or to detect motion on a real-time basis. In the sub-sampling procedure, the number of pixels within one motion detection block is reduced to one-fourth, for example, and therefore, the amount of calculation can be reduced approximately to one-fourth. However, if one takes notice of reading of a reference image block within a search area, it is necessary to read out every pixel within the search area. Where a memory is attached to the outside of a motion-detecting LSI or processor and reference image frames are stored in this memory, if the memory has a limited bandwidth (transfer efficiency), a great problem takes place. That is, every pixel within the search area is read out. Consequently, a large amount of data needs to be transferred between the memory and the motion-detecting LSI.

In the full-search method, the amount of data transferred between the motion-detecting LSI and the memory is reduced. However, it is necessary to control the motion detection operation in stepwise fashion. This complicates the circuitry and control operation. As a result, a long time is required to detect motion.

It is a first object of the present invention to provide a method and apparatus for detecting motion at an improved rate while preventing deterioration of the motion detection efficiency.

It is a second object of the invention to provide a method and apparatus for transmitting data between a memory and a motion-detecting portion at an improved efficiency by reducing the amount of data read from a search area within a reference image frame.

Other objects and features of the invention will be understood from the following description and accompanying drawings.

A motion detection method for achieving the above-described objects of the present invention starts with dividing a target block into plural blocks(hereinafter referred to as divided target blocks) at different pixel positions. Each of the divided target blocks is allocated for one of motion vectors representing motions of the target block. A reference image block is extracted from a reference area within a reference image frame. Pixel data are extracted from each divided target block. The degrees of similarity of the divided target blocks to the reference image block is obtained by calculating the degrees of similarity between each of the divided target blocks and one reference image block which is commonly used for these divided target blocks. A divided target block having the highest degree of similarity is found. The vector indicated by allocated for the block having the highest degree of similarity is detected as an optimum motion vector.

Figure 4:
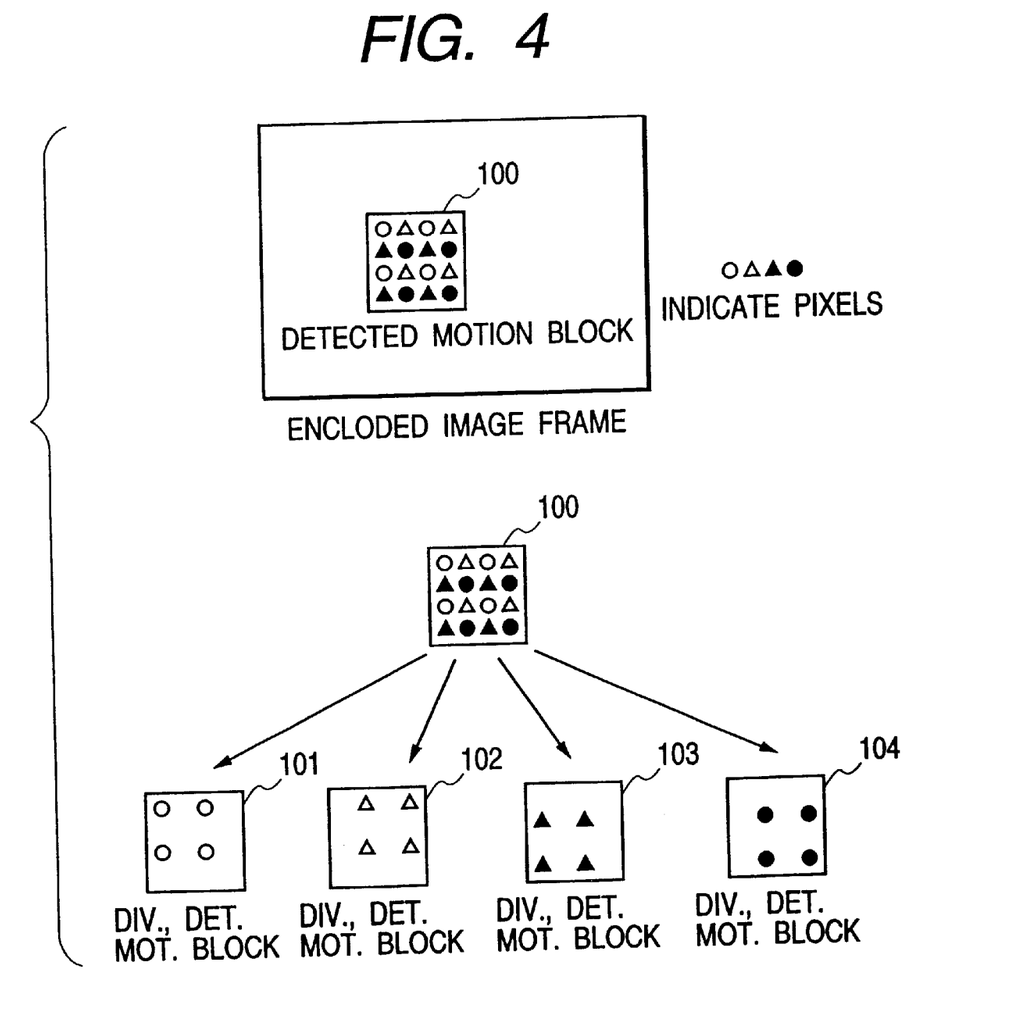
FIG. 4 is a diagram illustrating target blocks whose motions are detected by a method in accordance with the invention.
Figure 5A:
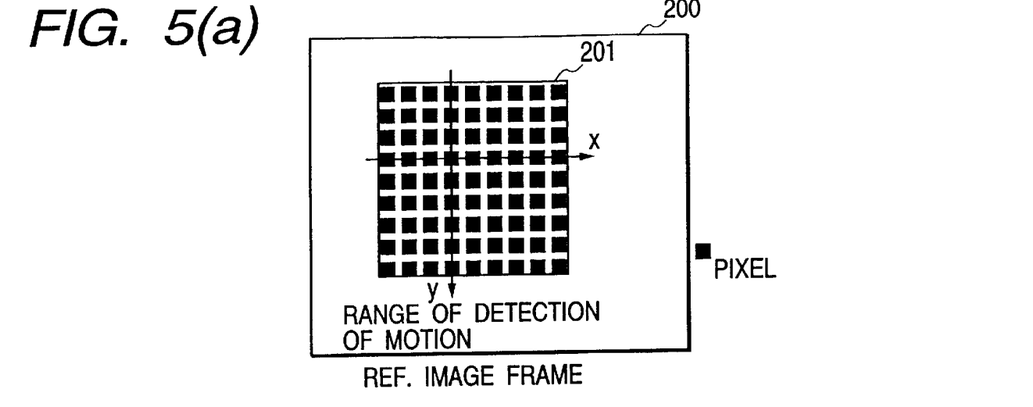
FIG. 5 is a diagram illustrating search areas in which motions are detected by a method in accordance with the invention.
Figure 5B:
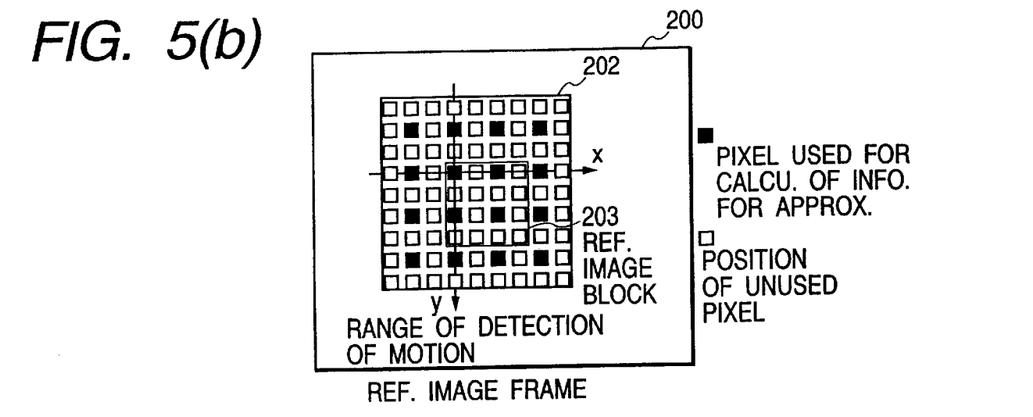
Figure 5C:
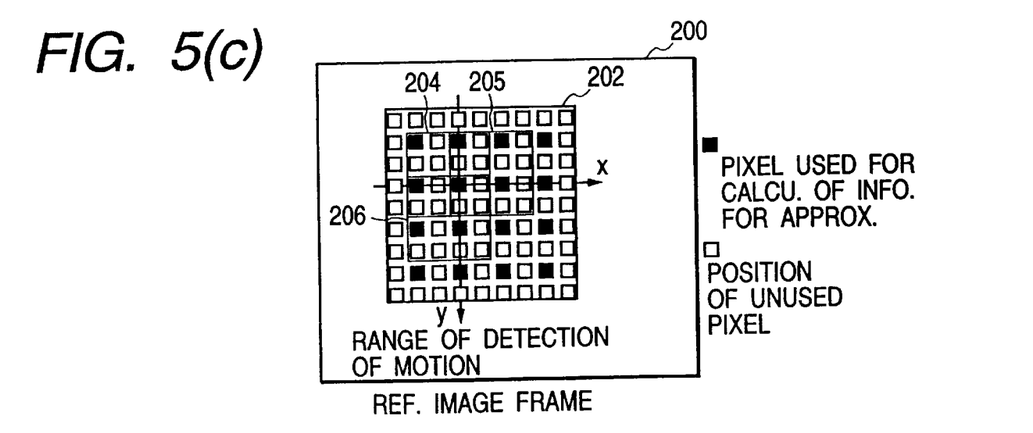
Figure 6:
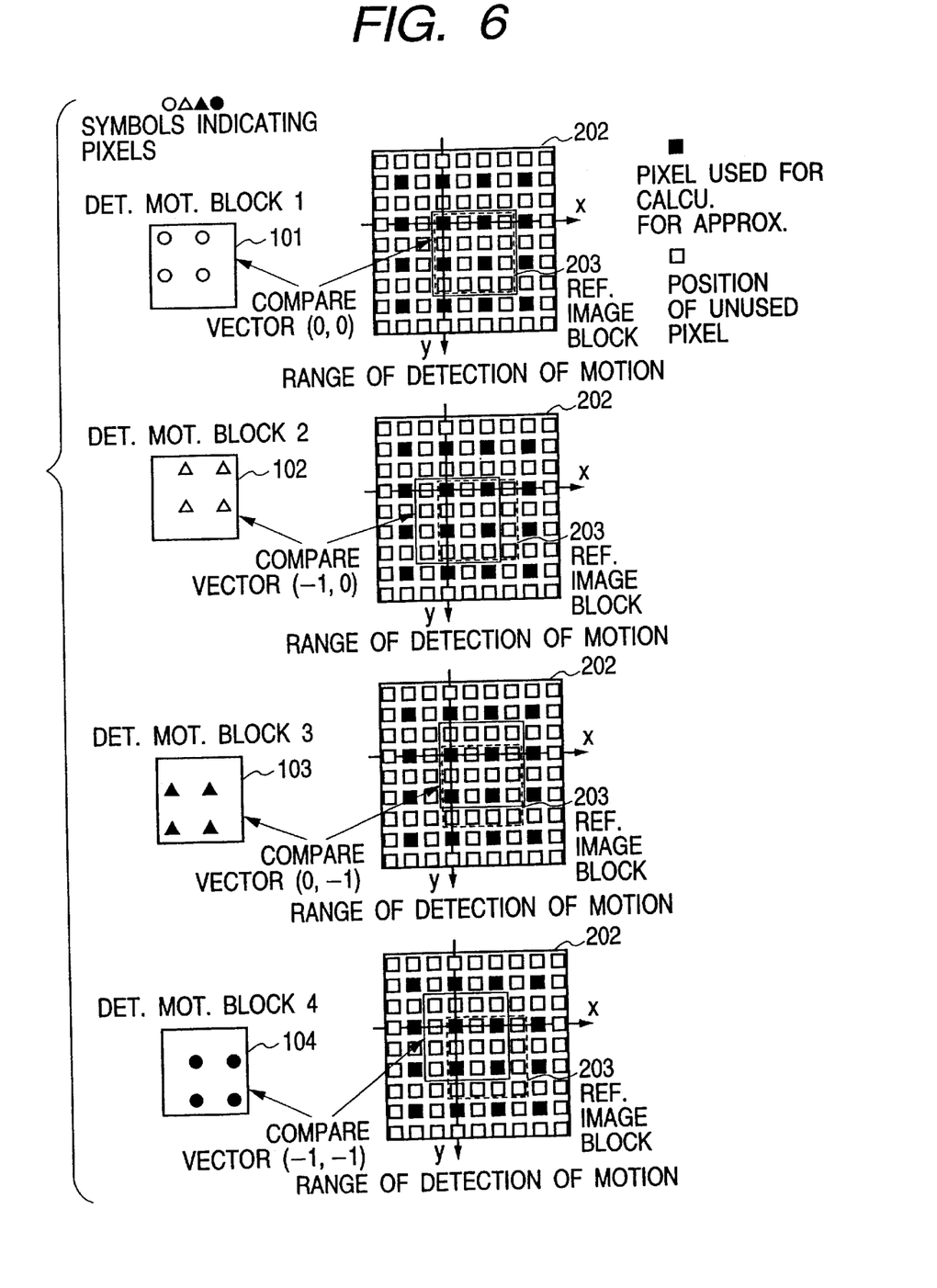
FIG. 6 is a diagram illustrating a comparison method used in a motion detection method in accordance with the invention.

The principle and the operation of the present invention are described by referring to FIGS. 4–6. As shown in FIG. 4, a target block 100 which is within an encoded image frame and whose motion should be detected is divided into four (4) divided target block units 101–104 that are in different pixel positions and indicated by white round circles, white triangles, black triangles, and black circles, respectively. Specifically, the divided target block unit 101 includes 4 pixels starting from the left upper corner of the target block, the 4 pixels being spaced from each other by 2-pixel displacement positions horizontally and spaced from each other by 2-line displacement positions vertically. Similarly, the divided target block unit 102 includes 4 pixels starting from the second pixel as counted from the pixel at the left upper corner, the 4 pixels being spaced from each other by 2-pixel displacement positions horizontally and spaced from each other by 2-line displacement positions vertically. The divided target block unit 103 includes 4 pixels starting from the first pixel on the second line as counted from the pixel at the left upper corner, the 4 pixels being spaced from each other by 2-pixel displacement positions horizontally and spaced from each other by 2-line displacement positions vertically. The divided target block unit 104 includes 4 pixels starting from the horizontally second pixel on the second vertical line as counted from the pixel at the left upper corner, the 4 pixels being spaced from each other by 2-pixel displacement positions horizontally and spaced from each other by 2-pixel displacement positions vertically.

Each of the divided target block units 101–104 is compared with the corresponding reference block extracted from the reference area in the reference image. As shown in FIG. 5(a), a search area 201 in which motion is detected is established within a reference image frame 200, and pixels are present in the search area 201. As shown in a reference image block 202 of FIG. 5(b), a pixel position in a reference frame that is identical in relative position with the position of the pixel at the left upper corner in a target block within the present image frame is taken as the origin. It is assumed that motion vectors are detected within horizontal positions of −3 to +2 pixel displacement positions (in the X-direction) and within vertical positions of −3 to +2 pixel displacement positions (in the Y-direction). In the figure, the senses of the arrows indicate the positive (+) direction.

Those pixels which are within the reference image frame 200 and necessary for motion detection are pixels in −3 to +5 pixel displacement positions in the X-direction and on −3 to +5 lines in the Y-direction as indicated by the search area 201. The reference image block 203 is appropriately extracted from this area. The target area 202 is obtained by causing the target area 201 to move 2-pixel displacement position horizontally and 2-line displacement position vertically. The origin of the reference image block 203 is at the left upper corner. The reference image block 203 is one block within the target area 202. There are 9 reference image blocks within the target area 202, and each reference image block is a square block extending over 2-pixel displacement positions horizontally and 2-pixel displacement positions vertically. These pixels are used for calculations of approximations. These reference image blocks 203, 204, 205, 206, and so on are read out in turn.

Signals derived from the 4 divided target block units 101–104 are compared in turn with signals derived from the reference image blocks 203, 204, 205, 206, etc. read out in turn as mentioned previously.

Signals produced from the detection block units 101–104 are compared with signals derived from one reference image block in the manner described below. One example of processing for comparing the reference image block 203 with the block units 101–104 is illustrated in FIG. 6. As shown in this figure, each one of the block units 101–104 is composed of pixels existing at different positions within the target block 100. Therefore, if they are compared with the same reference image block 203, they simultaneously produce data about degrees of similarity of four vectors (0,0), (−1,0), (0, −1), and (−1,−1). In this case, the block unit 101 corresponds to the vector (0,0). The block 102 corresponds to the vector (−1,0). The block 103 corresponds to the vector (0, −1). The block 104 corresponds to the vector (−1,−1). Similarly, data about degrees of similarity to the reference image blocks 204, 205, 206, and so forth are derived.

DESCRIPTION OF THE PREFERRED EMBODIMENTS

Figure 1:
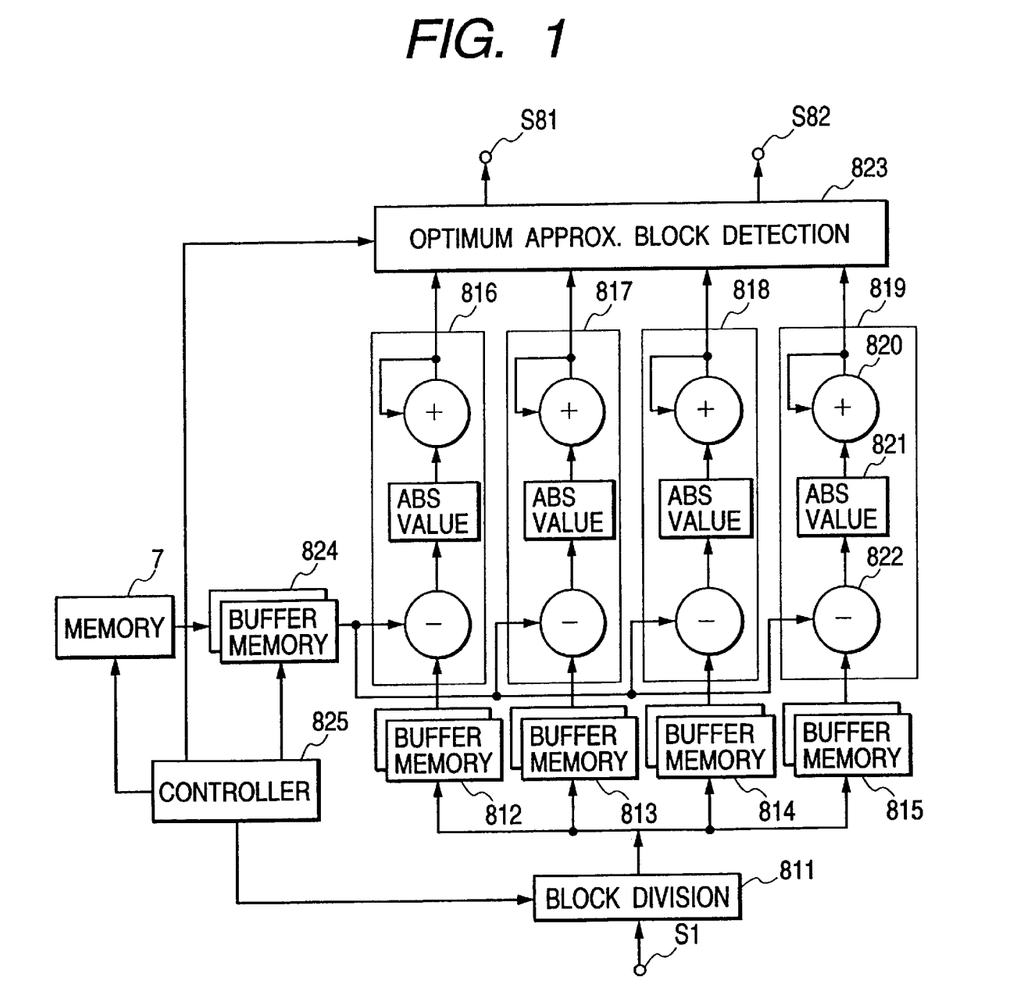
FIG. 1 is a block diagram of a motion detection apparatus for executing an image motion detection method in accordance with the present invention.

FIG. 1 is a block diagram of a motion detection apparatus for executing an image motion detection method in accordance with the present invention. To facilitate understanding of the functions of the present embodiment, one example of a video encoder using a motion detection apparatus is described by referring to FIG. 2.

Figure 2:
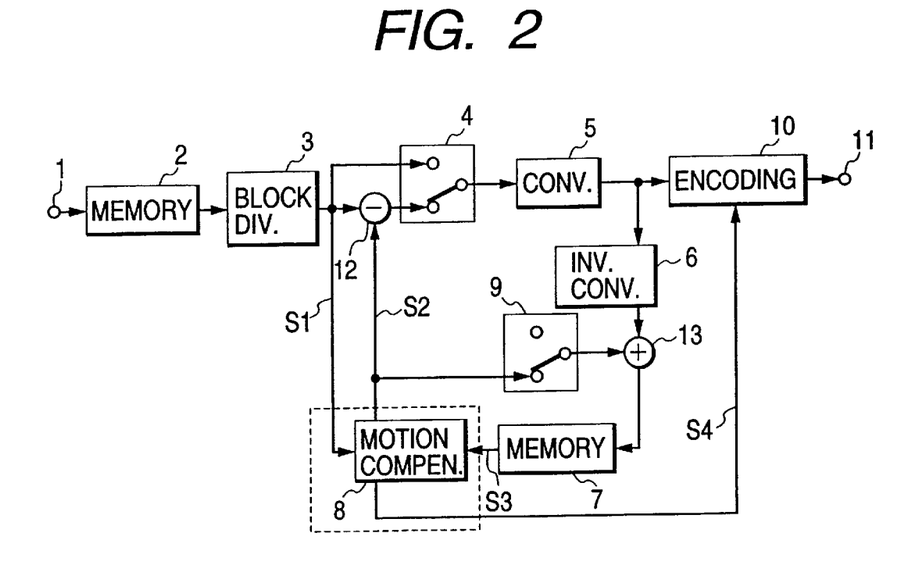
FIG. 2 is a block diagram of a video encoder using a motion detection apparatus in accordance with the invention.

Referring to FIG. 2, an image frame includes a two-dimensional image containing X pixel positions in the horizontal direction and Y vertical lines. A signal from this image frame to be encoded is entered from a terminal 1 and stored in a memory 2. The signal is divided into plural blocks by a block division portion 3. Each block formed by the division contains x pixel positions in the horizontal direction and y vertical lines. Note that no limitations are imposed on the configuration of each block. A signal S1 about each block whose motion should be detected and thus subjected to compression is applied to a computing device 12 and a motion compensator 8.

The motion compensator 8 includes a motion detection apparatus in accordance with the present invention. The compensator 8 searches the memory 7 storing decoded images (reference image frames) for a block S2 (hereinafter referred to as the reference image block) closest to the target block S1, and produces the two-dimensional displacement between the target block S1 and the reference image block signal S2 as a motion vector S4. The computing device 12 finds the difference between the reference image block signal S2 corresponding to the motion vector S4 detected by the motion detector and the signal S1 indicating the target block for each pixel.

The signal S1 about the block to be compressed is output from block division portion 3. In some cases, this block is compressed as it is (intra coded). In other cases, the difference between this block and a reference image block is compressed (inter coded). This mode is switched by a switch 4. Since the present invention is not directly associated with the switching between these two types of coding, the switching is not illustrated. The intra coded block signal S1 or inter coded difference between the signal S1 and the reference image block signal S2 is input to a converter 5. This converter 5 is composed of a two-dimensional discrete cosine transform portion and a quantization portion. The converter 5 subjects the input block signal to one kind of frequency transformation, quantizes the signal in a frequency band, and sends it to an encoder 10. The encoder 10 encodes the block signal which is quantized and frequency converted into codes with variable lengths. Where it is necessary to encode the motion vector in inter coding scheme, motion vector S4 entered from the motion compensator 8 is also encoded and sent to a code sequence output port 11.

A part of the signal from the converter 5 is applied to an inverse converter 6, which performs processing inverse to the processing performed by the converter 5. That is, the inverse converter 6 performs inverse quantization and two-dimensional inverse discrete cosine transform to transform the frequency-converted signal into an image block signal. The block signal is stored in the memory 7 as it is in intra coding scheme. In inter coding scheme, an adder 13 adds the reference image block signal S2 to the image block signal. The resulting signal is stored in the memory 7 under control of a switch 9 interlocking with the switch 4. As a result of the operation described thus far, one image frame is wholly decoded (locally decoded) and stored in the memory 7.

Figure 3:
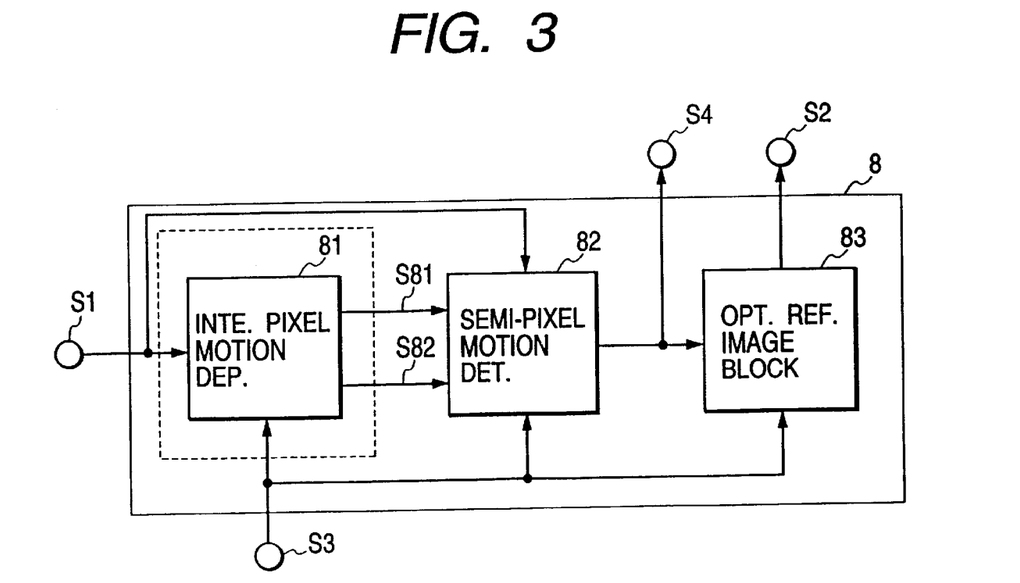
FIG. 3 is a block diagram of a motion compensation portion of the encoder shown in FIG. 2.

FIG. 3 shows the structure of the motion compensator 8, which comprises an integer-pixel displacement detection portion 81, a half-pixel displacement detection portion 82, and an extraction portion 83 for extracting an optimum reference image block. The integer-pixel displacement detection portion 81 references the motion detection block signal S1, detects motion only at pixel positions within the reference image frame S3, and enters a motion vector S81 of the portion of the highest degree of similarity and information S82 about the degree of similarity at that time into the half-pixel displacement detection portion 82. This half-pixel displacement detection portion 82 uses horizontally or vertically half-pixel displacement positions as pixel positions within the reference image frame and detects motion. That is, the half-pixel displacement detection portion 82 is a motion detection portion that finds the vector between pixels as a motion vector and produces an output signal S4 indicating the found motion vector. The extraction portion 83 detects the reference image block of the highest degree of similarity from the reference image frame S3 and from the output from the half-pixel displacement detection portion 82, and produces a motion vector S2. Furthermore, the extraction portion 83 reads the optimum reference image block S3 from the memory 7. Movement of the detected block from pixel to pixel is detected by the integer-pixel displacement detection portion 81. Movement within the spacing between the pixels (in this example, half of the spacing) is detected by the half-pixel displacement motion detection portion 82. The extraction portion 83 selects the reference image block of the highest degree of similarity from the results of detections made by the integer-pixel displacement detection portion 81 and from the results of detections made by the half-pixel displacement detection portion 82, and delivers the selected block. Of course, if the detected block moves only from pixel to pixel, the reference image block of the highest degree of similarity is determined according to the results of detections made by the integer-pixel displacement detection portion 81.

The present invention especially relates to the integer-pixel displacement detection portion 81. The structure and the operation of this portion are described in detail by referring back to FIG. 1. To simplify the description, it is assumed that the target block is divided into divided target block units each including 4×4 pixels as already described in connection with FIG. 4.

The target block signal S1 is entered from the memory 2 such as a general-purpose DRAM and distributed between two-sided buffer storages of four divided target block units 812–815 by the block division portion 811 under address control. In consequence, divided target block unit signals 101–104 shown in FIG. 4 are stored in the divided target block units 812–815, respectively.

The four block unit signals 101–104 are produced from the four divided target block units 812–815, respectively, and applied to degree of similarity computing devices 816–819, respectively. These computing devices 816–819 have the same construction, and each comprises two-input subtractor 822, an absolute value output portion 821 for producing the absolute value of the difference between the values at the two inputs, and an accumulator 820 for accumulating the output from the absolute value output portion. These components are connected in series. These degrees of similarity computing devices operate parallel. Pixel signals from the block units 101–104 shown in FIG. 4 are applied to one input of each subtractor. Pixels indicated by the black squares in FIGS. 5(*b*) and 5(*c*) are applied to the other input from the reference image frame signal S3 in the memory 7. These pixels are used for calculation of approximations of reference image blocks (e.g., 203–206 of FIGS. 5(*b*) and 5(*c*)) in the target area 202 of FIG. 5(*b*). That is, one pixel is applied commonly to each of the other inputs described above, while pixel signals from different divided target block units are applied to one input of each subtractor.

When calculations corresponding to the number of pixels (four pixels) of each reference image block end, the degree of similarity computing devices 816–819 produce the calculated degrees of similarity to the optimum approximation block detection portion 823. Because of the structure described above, information about four approximations and four motion vectors (e.g., four different vectors (0,0), (−1,0), (0,−1), and (−1,−1)) as shown in FIG. 6) can be obtained simultaneously by calculations about one reference image block. When calculations about one reference block 203 end, a control signal from a control circuit 825 resets the accumulators 820 of the degree of similarity computing devices 816–819. Similar calculations are performed on all the reference blocks (in the case of FIG. 5, nine reference image blocks such as reference image blocks 203, 204, etc.) within the search area 202 applied successively.

An optimum approximation block detection portion 823 detects a reference image block having the highest degree of similarity among information about degrees of similarity of all reference blocks within the search area 202, as well as a degree of similarity computing device that has succeeded in detecting the reference image block having the highest degree of similarity. The detection portion 823 detects the motion vector when the reference image block having the highest degree of similarity is detected, and produces motion vector S81 in detecting integer-pixel displacements and information S82 indicating the highest degree of similarity. The highest degree of similarity is detected by a known fundamental maximum value detection circuit. Since relative addresses of the four block units have been previously set (i.e., the block units 102, 103, and 104 have shifted a displacement of −1 in the x-direction, a displacement of −1 in the y-direction, and displacements of −1 and −1 in the x- and y-directions, respectively, relative to the block unit 101 as shown in FIG. 6), a simple adder-subtractor circuit for performing additive or subtractive operations on the four shifted addresses and for the address of the reference image block is incorporated in an optimum approximation block detection portion 821 to find a motion vector.

In the description provided thus far, the block comprising 4 pixel positions in the horizontal direction and 4 lines in the vertical direction is treated as a target block whose motion is to be detected, and this block is divided into four block units. It is to be noted that no limitations are imposed on the size of the block whose motion should be detected, the number of block units, the search area, or the like. The same method can be executed for target blocks of any arbitrary size, any arbitrary number of block units, and any arbitrary search area. For example, the block whose motion is to be detected may be a two-dimensional block having 16 pixel positions in the horizontal direction and 16 pixel positions in the vertical direction. This may be divided into 16 block units successively shifted with respect to each other by 4 pixel spacings horizontally and vertically. Each of the 16 block units consists of 4 pixel positions in the horizontal direction and 4 pixel positions in the vertical direction. As another example, the block whose motion is to be detected may be a two-dimensional block having 16 pixel positions in the horizontal direction and 16 pixel positions in the vertical direction. This block may be divided into 4 block units which are successively shifted with respect to each other by 3 pixel spacings horizontally and vertically. Each of the 4 block units has 8 pixel positions in the horizontal direction and 8 pixel positions in the vertical direction.

Figure 7:
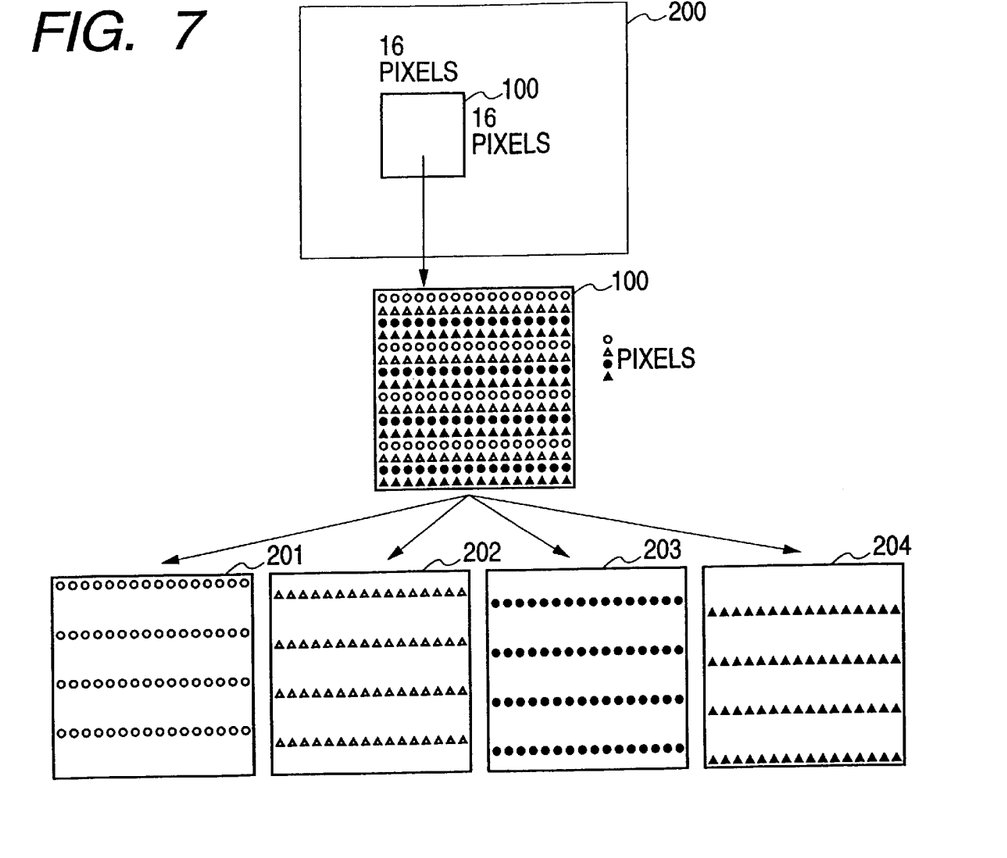
FIG. 7 is a diagram illustrating target blocks whose image motions are detected by a method in accordance with a second embodiment of the invention.

FIGS. 7–12 illustrate a second embodiment of the method of detecting image motion in accordance with the present invention. In the present embodiment, as shown in FIG. 7, a two-dimensional image (known as a macroblock in MPEG and other technologies) block having 16 pixel positions in the horizontal direction and 16 pixel positions in the vertical direction is used as a target block 100 whose motion is to be detected. The target block 100 is divided into four divided target block units 201, 202, 203, and 204 each of which has 16 pixel positions in the horizontal direction. These divided target block units 201–204 are shifted with respect to each other by 4 pixel spacings in the vertical direction. The motion detection apparatus for executing the present embodiment is similar in structure to that shown in FIG. 1 except for the number of pixels. Therefore, description of the motion detection apparatus is omitted below.

Figure 8:
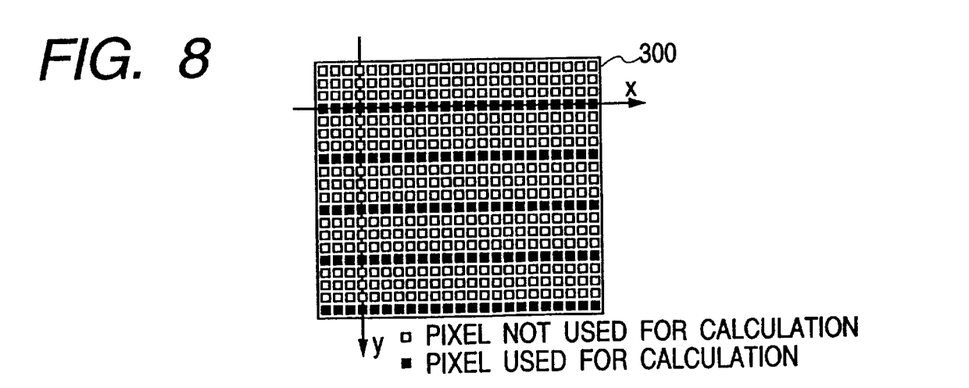
FIG. 8 is a diagram illustrating a search area in a reference image frame in which motion is detected by a method in accordance with the second embodiment of the invention.

FIG. 8 shows a search area in which motion of a reference image is detected, as well as pixels used for calculations of degrees of similarity. In this figure, black squares indicate pixels used for calculations of information about degrees of similarity or approximations. White rectangles indicate pixels not used for calculations of information about degrees of similarity or approximations, and x- and y-axes show bases of pixel positions. In the present embodiment, the search area ranges from −3 pixel position to +5 pixel position in the horizontal direction and ranges from −3 pixel position to +5 pixel position in the vertical direction.

In the same way as in the first embodiment described above, motion vectors representing block units 201–204 are created. These block units 201–204 are simultaneously compared with the same reference image block extracted from a search area 300 in a reference image. The degrees of similarity of the blocks are delivered. A vector indicated by a block unit having the highest degree of similarity is detected as an optimum vector. For example, as shown in FIGS. 9–12, the degrees of similarity of the block units 201–204 to the reference image blocks 403, 404, 405, and 406 at their respective identical positions are calculated simultaneously, the blocks 403–406 being extracted from the search area 300 in the reference image. For instance, the degrees of similarity of the block units 201–204 to the reference image block 403 are computed simultaneously. With respect to pixel positions used for the calculations of the degrees of similarity, pixel positions in the reference image block 403 are common to the block units 201–204. On the other hand, with respect to the divided target block units 201–204, pixels at different positions are used for calculations of degrees of similarity. Similar calculations of degrees of similarity to other reference image blocks 404, 405, and 406 are performed.

Figure 9:
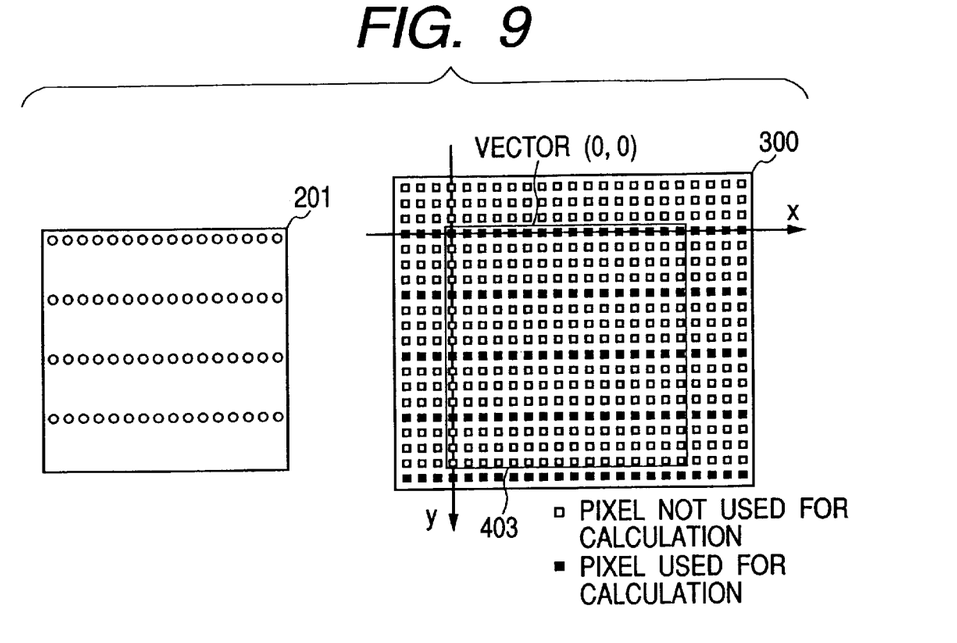
FIGS. 9–12 are diagrams illustrating a method of detecting image motion in accordance with the second embodiment of the invention.
Figure 10:
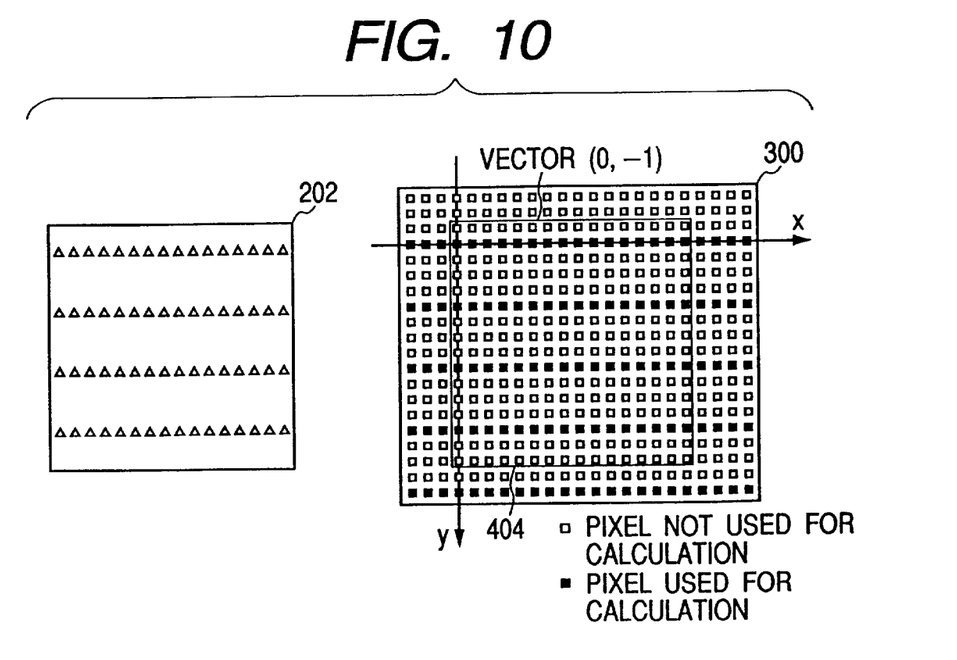
Figure 11:
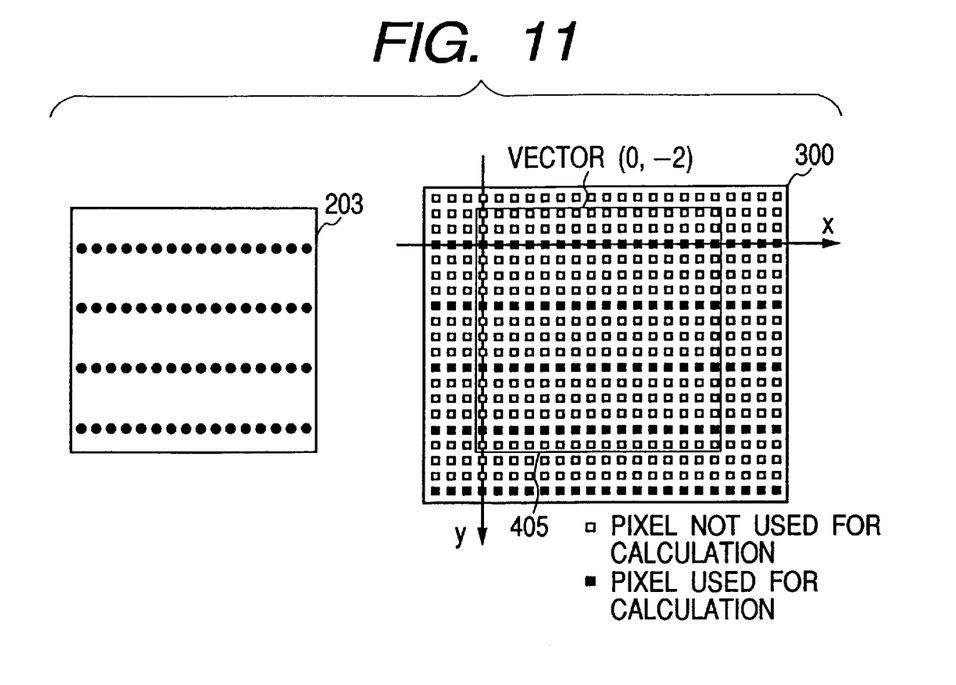
Figure 12:
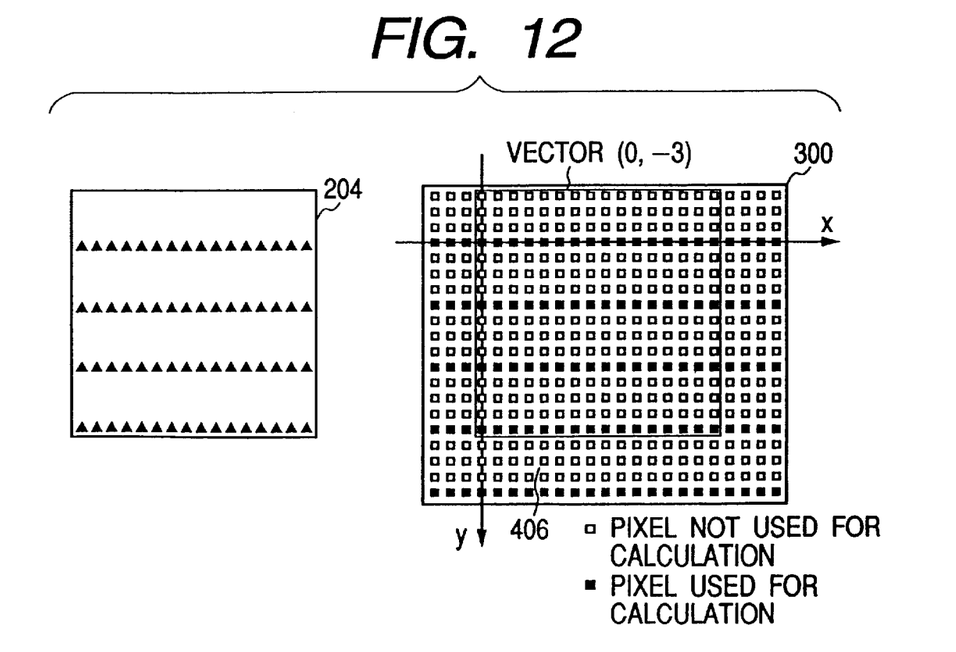

In the case of FIG. 9, the divided target block unit 201 and the reference image block 403 are identical in pixel position and so they correspond to motion vector (0,0). In the case of FIGS. 10–12, the reference image block 403 has the same pixel position. However, the divided target block units 202–204 are shifted by −1 pixel position, −2 pixel positions, and −3 pixel positions, respectively, in the vertical direction but does not shift in the horizontal direction. Therefore, they correspond to motion vectors (0,−1), (0,−2), and (0, −3), respectively. In consequence, four motion vectors can be found at the same time.

Often, reference image frames are stored in externally attached DRAMs. In the DRAMs, the same line (horizontal rows of pixels) in a reference image frame is recorded on the same word line. Therefore, horizontal pixels can be read out continuously at a relatively high efficiency. Where a target block whose motion is to be detected is sampled vertically to create block units and these block units are used as in the present embodiment, reference image blocks can be read from the reference image frame with the highest efficiency.

Figure 13:
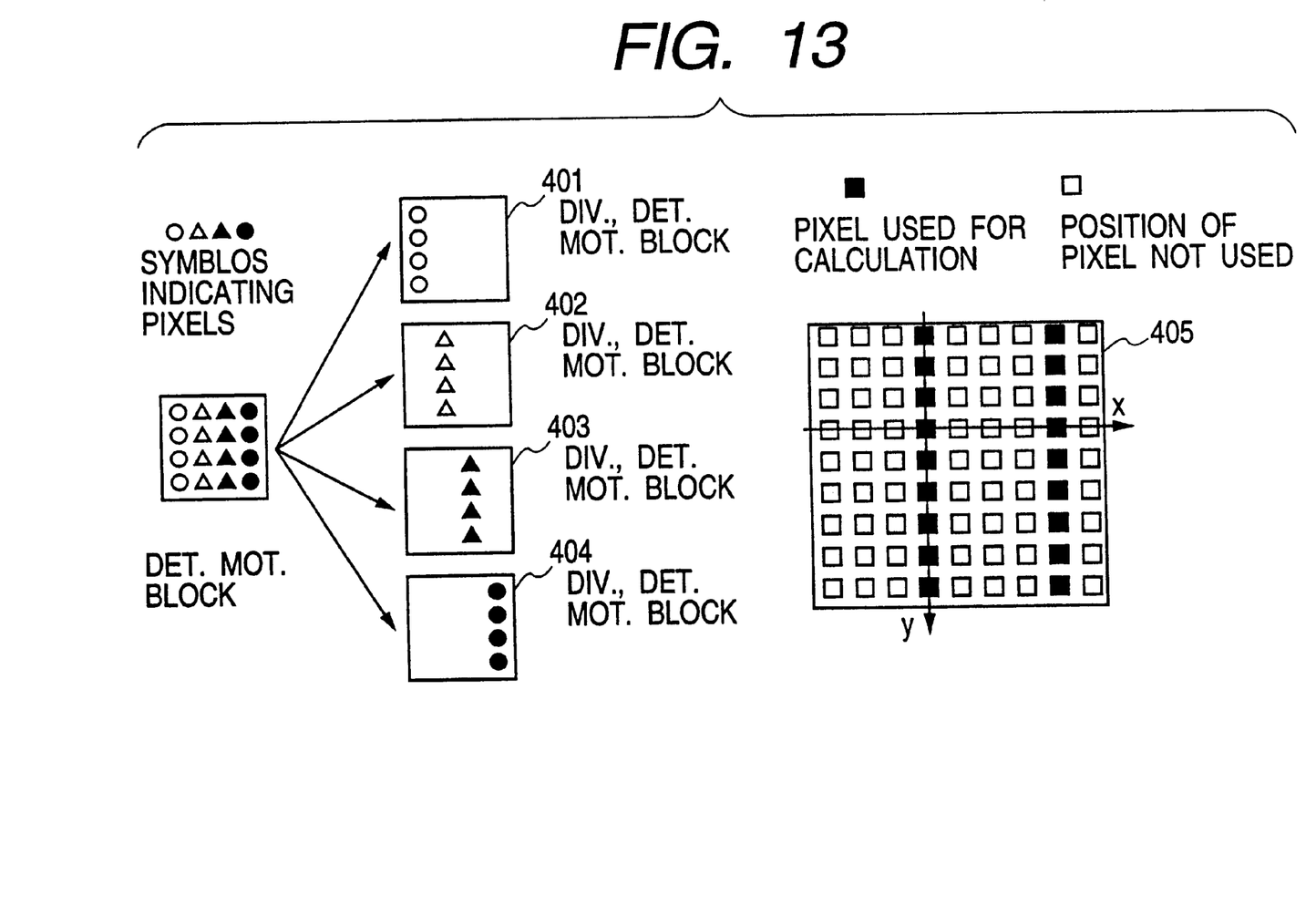
FIG. 13 is a diagram illustrating target blocks for a method of detecting image motion in accordance with a third embodiment of the invention.

FIG. 13 illustrates a third embodiment of the present invention. In this embodiment, each divided target block unit, 401–404, has 4 pixel positions in the vertical directions and 4 pixel positions in the horizontal direction. At this time, a search area 405 can be extracted from the reference image block by taking every 4 horizontal lines (pixel positions). Since the processing method is the same as the processing method of the first embodiment described above, description of the method is omitted. Where the target block is a 16×16 macroblock, 16 pixel positions are present in the vertical direction. The block may be divided into four horizontally by taking every 4 lines.

Figure 17:
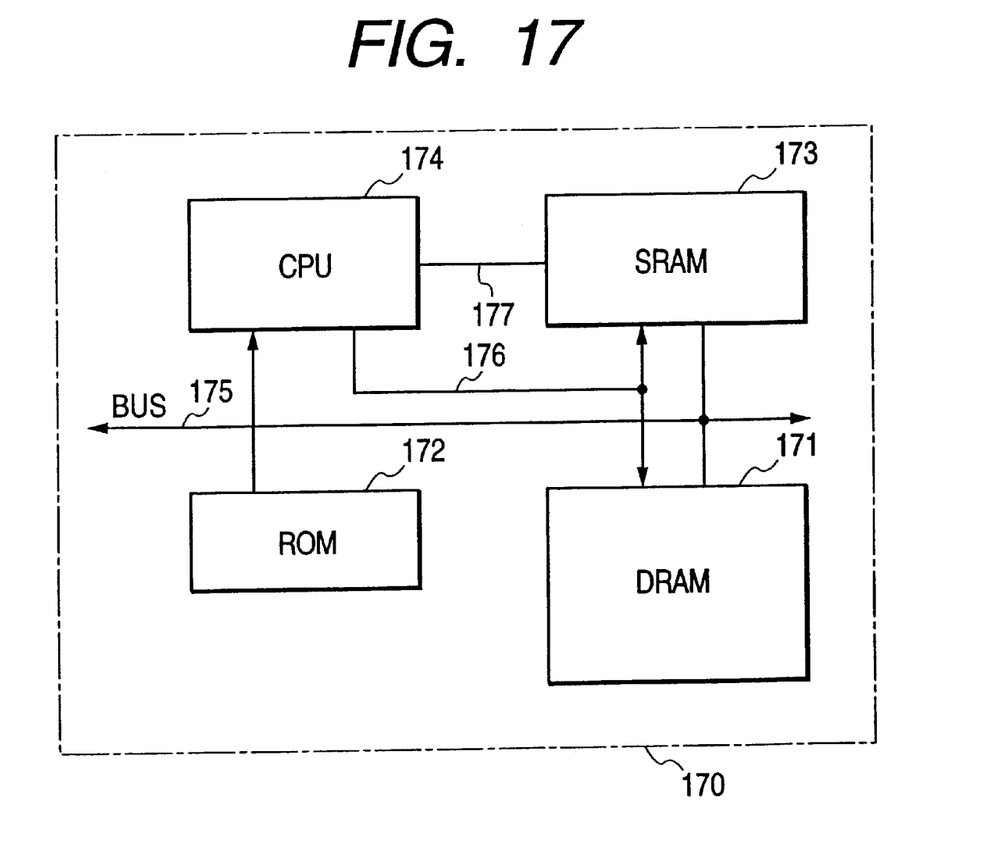
FIG. 17 is a block diagram of another motion detection apparatus in accordance with the invention.

FIG. 17 illustrates a fourth embodiment of the present invention. In the illustrated embodiment, a processor 170 performs the functions of FIG. 1. A circuit block surrounded by the dot-and-dash line is formed as a single semiconductor chip fabricated by a well-known semiconductor fabrication technology, which does not limit the scope of the present invention. In FIG. 17, a CPU 174 runs a reduced instruction set (RISC), and supports SIMD (single-instruction, multiple-data) instructions. A program for causing the CPU 174 to run desired processing is loaded in a ROM (read-only memory) 172. As is well known in the art, this program uses plural kinds of reduced numbers of instructions. SIMD instructions are included in the program.

Also shown in FIG. 17 are a dynamic RAM (DRAM) 171, a static RAM (SRAM) 173, a bus 175 connecting the DRAM 171 and the SRAM 173, and an address bus 176 for supplying addresses from the CPU 174 to the DRAM 171 and to the SRAM 173.

The DRAM 171 serves as the memory 7 shown in FIG. 1. The SRAM 173 acts as the buffer storages 812, 813, 814, and 815 shown in FIG. 1. In accordance with the program, the CPU 174 accesses the DRAM 171 and the SRAM 173, reads information about the pixels in the target block from the DRAM, and writes the pixel information into the buffer storages 812–815 assigned within the SRAM. During this access operation, pixel data held in different addresses in the target block are stored in different areas within the SRAM that are assigned as the buffer storages 812–815. This operation divides the block. The CPU 173 calculates the degrees of similarity and detects a block of the highest degree of similarity from the data held in the buffer storages 812–815 in the SRAM (data about the block units whose motion should be detected). In the calculation of the degrees of similarity, SIMD instructions are used. The SIMD instructions cause the CPU to perform 4 calculations simultaneously as in the example of FIG. 1. The CPU 174 also performs calculations (additions and subtractions of vectors as described above) on vectors corresponding to the block of the highest degree of similarity. The reference image block used for the calculations of degrees of similarity is transferred from the DRAM to the SRAM by the access operation of the CPU. Thus, operations regarding calculations of degrees of similarity and other calculations are performed between the CPU and the SRAM, thereby increasing the speed. The use of the SIMD instructions for the calculations also speeds up the processing.

In accordance with the present invention, plural degrees of similarity can be calculated by reading one reference image block for plural divided target block units. This achieves higher processing speed. Furthermore, the bus 176 can be used efficiently in transmitting data.

Where pixel information is stored in the DRAM and/or the SRAM such that 1 line of pixel information is read by selecting one word line, the target block units can be transmitted from the DRAM to the SRAM or into the CPU with a reduced number of accesses. Similarly, a reference image block can be transmitted from the DRAM to the SRAM or into the CPU with fewer accesses. In this case, pixel information is stored as already described in connection with FIGS. 7–12. Pixel information is read out with one or a few accesses.

In the embodiment shown in FIG. 17, reference image frames and target blocks are stored in the DRAM 171 that can have large capacity. In the description provided above, data about a reference image block are transferred into the SRAM once for calculations of degrees of similarity. Of course, data about the reference image block may be sent from the DRAM into the CPU. In this embodiment, the CPU 174 is not connected with the bus 175. Of course, the CPU may be connected with the bus. Furthermore, the DRAM may be mounted outside the semiconductor chip described above.

In the present invention, a target block is divided into plural block units whose motion should be detected. These divided target block units are compared with a common reference image block. A degree of similarity of each block unit to the reference image block (information about the degree of similarity) can be represented in terms of a vector, and signal indicating this vector can be produced. That is, information about vectors representing the degrees of similarity of the block units to the common reference image block can be found.

In this way, the time taken to read data from a search area in which motion is detected can be shortened. That is, the amount of data read from the search area within a reference image frame can be reduced, and the efficiency of transfer between the memory and the motion detecting portion can be improved. In addition, the same number of objects as the number of block units created by division can be detected simultaneously. Hence, the detection and calculations for motion can be performed with greater speeds.

What is claimed is:

1. An apparatus for detecting a motion vector representing motion of a target block which is one of a plurality of target blocks being provided from a frame of a target image by dividing the frame of the target image, relative to a reference frame of image, comprising:

a dividing unit for dividing said target block which is stored in a dynamic memory and which provides data related to a word line by selecting a word line from the word lines in said dynamic memory, into a plurality of blocks, wherein each of the plurality of blocks has pixel data at different pixel positions of the target block by the selection of different word lines, wherein each of the plurality of blocks is stored in a static memory, and wherein each of the plurality of blocks is allocated to one of vectors representing motion of said target block;

a parallel calculating unit for comparing said plurality of blocks with a reference image block extracted from a search area within said reference frame of image which is stored in the dynamic memory, with respect to pixel data, and finding degrees of similarity of said plurality of blocks to said reference image block; and an approximate block detection unit for selecting one of said plurality of blocks according to the degrees of similarity that are found and detecting a vector allocated to the selected block as a candidate of the motion vector representing motion of the target block.

2. The apparatus of claim 1, wherein said target block is a two-dimensional block having 16 pixel positions horizontally and 16 pixel positions vertically.

3. The apparatus of claim 1, wherein each of said plurality of blocks has 16 pixel positions horizontally and 4 vertical lines located at every 5 pixel positions vertically.

* * * * *